US008770626B2

(12) United States Patent
Hanrahan et al.

(10) Patent No.: US 8,770,626 B2
(45) Date of Patent: Jul. 8, 2014

(54) METHOD AND APPARATUS FOR SUPERPOSED APPLICATION OF SHIPPING LABELS OVER PACKING SLIPS

(75) Inventors: Daniel Hanrahan, Hinsdale, IL (US); Mark Woodworth, Oak Park, IL (US); Timothy Hanrahan, Frankfort, IL (US); David Dambek, Wheaton, IL (US)

(73) Assignee: Numina Group, Incorporated, Woodbridge, IL (US)

( * ) Notice: Subject to any disclaimer, the term of this patent is extended or adjusted under 35 U.S.C. 154(b) by 817 days.

(21) Appl. No.: 12/759,319

(22) Filed: Apr. 13, 2010

(65) Prior Publication Data

US 2010/0259037 A1 Oct. 14, 2010

Related U.S. Application Data

(60) Provisional application No. 61/168,811, filed on Apr. 13, 2009, provisional application No. 61/168,839, filed on Apr. 13, 2009.

(51) Int. Cl.

| | |
|---|---|
| ***B42D 1/00*** | (2006.01) |
| ***B42D 19/00*** | (2006.01) |
| ***B42D 15/00*** | (2006.01) |
| ***B42D 15/10*** | (2006.01) |
| ***G09C 3/00*** | (2006.01) |

(52) U.S. Cl.

USPC .......... 283/81; 281/2; 281/5; 283/67; 283/70; 283/72; 283/74; 283/79; 283/94; 283/100; 283/101

(58) Field of Classification Search

USPC ........ 281/2, 5; 283/67, 70, 72, 74, 79, 81, 94, 283/100, 101

See application file for complete search history.

(56) References Cited

U.S. PATENT DOCUMENTS

| | | | | |
|---|---|---|---|---|
| 4,844,771 | A | 7/1989 | Crankshaw et al. | |
| 5,419,591 | A * | 5/1995 | Lambert et al. | 283/79 |
| 6,067,103 | A | 5/2000 | Ewert et al. | |
| 6,186,554 | B1 | 2/2001 | Raming | |
| 6,213,518 | B1 | 4/2001 | Raming | |
| 6,615,106 | B2 | 9/2003 | Soto et al. | |
| 6,616,189 | B2 | 9/2003 | Raming | |
| 6,953,207 | B2 | 10/2005 | Raming | |
| RE39,100 | E | 5/2006 | Raming | |

OTHER PUBLICATIONS

Weber Labels & Labeling Solutions: Model 5300 Label Printer-Applicators; brochure; Feb. 2008, 4 pages.

(Continued)

*Primary Examiner* — Shelley Self
*Assistant Examiner* — Justin V Lewis
(74) *Attorney, Agent, or Firm* — Reinhart Boerner Van Deuren P.C.

(57) ABSTRACT

The invention provides a method and apparatus for applying shipping labels over both folded or non-folded packing slips, or the like, at a single print-and-apply station, either through use of a label configured for application to a substrate and also in a superposed registered manner to another label of identical construction previously attached to the substrate, or by using a shipping label having a non-aggressive adhesive applied to a removable center section of the shipping label for attachment of the packing list, or the like, to the shipping label prior to application of the shipping label to the substrate.

7 Claims, 16 Drawing Sheets

(56) References Cited

OTHER PUBLICATIONS

Cheetah Systems; Heavy Duty Bar Code Labeling System; webpage; date last visited Apr. 5, 2010; 1 page, www.cheetahsystemsllc.com/autocase.html.
The Numina Group; Print and Apply Labeling Systems; webpage; date last visited Apr. 5, 2010; 2 pages, www.numinagroup.com/products/packing-labeling-automation/item/.
The Numina Group; One-Step Fulfillment System; brochure; known prior to Apr. 13, 2010; 2 pages.
The Numina Group; The USA's Leading Material Handling Integrator; webpage; date last visited Mar. 20, 2009; 1 page; www.numinagroup.com.
The Numina Group; Super Charge Your Labeling Process; brochure; 2 pages.
The Numina Group; Increase Picking Speed and Accuracy at Your Operation; brochure; 2 pages.
The Numina Group; Pick Execution Systems; webpage; date last visited Mar. 20, 2009; 2 pages; www.numinagroup.com/product__pages/products-pickexecution.html.

* cited by examiner

METHOD AND APPARATUS FOR SUPERPOSED APPLICATION OF SHIPPING LABELS OVER PACKING SLIPS

CROSS-REFERENCE TO RELATED PATENT APPLICATIONS

This application is a non-provisional application and claims the benefit of U.S. Provisional Application No. 61/168,811, filed Apr. 13, 2009 and also claims the benefit of U.S. Provisional Application No. 61/168,839, filed Apr. 13, 2009, both of which are incorporated herein in their entirety by this reference.

FIELD OF THE INVENTION

This invention generally relates to application of shipping labels and packing slips on a carton in such a manner that the shipping label may be read by the public, but the packing slip is hidden from public view until the shipping label is removed, and more particularly to automated application of shipping labels over both folded or non-folded packing slips at a single print-and-apply station.

BACKGROUND OF THE INVENTION

When shipping a carton or other package to a recipient, it is often advantageous for the shipper to provide both a packing slip and a shipping label which can be applied to and accessed from the outside of the carton. In one commonly used approach, a packing slip is placed between the shipping label and an outside surface of the carton in such a manner that the packing slip is not visible or accessible from outside the package without tearing away a portion of the shipping label. Through the years a number of approaches have been utilized for providing such packing slip and label arrangements.

In one prior approach, shown in U.S. Pat. No. 6,186,554; 6,213,518; and RE 39,100 E, to Raming, a Duplex Carton Label/Packing List Arrangement is disclosed which utilizes duplex printers to apply printing to both sides of a form simultaneously. The need for a duplex printer and applying printing on both sides of the forms makes this approach more cumbersome and expensive than is desirable.

Another approach is shown in U.S. Pat. No. 6,616,189 B2, to Raming, for a Sequentially Placed Shipping and Packing Label System. In this approach, a packing list is applied at a first station onto a carton. A shipping label is then applied at a second station over the top of the packing list and in registry over and in surrounding relationships to the packing list. When an optional return label is used the packing list is applied over and in surrounding relationship to the return label, with each being adhered to the carton. With this arrangement, the return label, packing list, and shipping label are of different sizes increasing sequentially outward from the surface of the carton with the shipping label being the largest and the return label being the smallest. This approach suffers from several drawbacks. First, the necessity for having three different sizes of labels substantially complicates the application process and increases costs. In similar fashion, the need for sequentially applying the labels at separate stations requires a doubling or tripling of the equipment necessary to apply labels to a single carton, which increases the complexity and cost of such a system to a point that it is not practical for installation and use by many shippers.

It is also often desirable to provide a packing list having a size that is larger than a typical shipping label. For example, it is desirable to have packing lists be printed on an 8½" by 11" piece of paper. None of the labeling systems described above are amenable to use with larger size packing slips. In the past, it has been necessary to place such larger size packing slips inside of the carton, prior to closing the carton, or to manually insert the folded packing list into a pouch attached to an outside surface of the carton. placing the packing list inside of the carton makes verification of the items on the packing list difficult at the time the shipping label is subsequently applied. Approaches involving a plastic or paper pouch attached to the side of a carton, with the packing list being subsequently inserted into the pouch as a second step in the process of packing and preparing the carton for shipping, are labor intensive and undesirable as also adding additional cost. In addition, where a packing list must be folded prior to inserting it into a pouch the cost is increased even further.

What is needed, therefore, is an improved method and apparatus for applying shipping labels and packing slips, folded or otherwise, onto a carton or other substrate.

BRIEF SUMMARY OF THE INVENTION

The invention provides a method and apparatus for applying shipping labels over either folded or non-folded packing slips, or the like, at a single print-and-apply station, either through use of a label configured for application to a substrate and also in a superposed registered manner to another label of identical construction previously attached to the substrate, or by having a non-aggressive adhesive applied to a removable center section of the shipping label for attachment of the packing list, or the like, to the shipping label prior to application of the shipping label to the substrate or another label.

In one form of the invention, a label, includes a sheet of material defining a face side and an oppositely facing back side. The sheet also includes a center section attached to a border section which is disposed outboard from the center section, with the center section being attached to the border section by a line of weakness. The label has an adhesive pattern attached thereto on the back side of the sheet in the border section, with the adhesive pattern having an inboard edge thereof which is spaced outboard away from the line of weakness by an adhesive-free zone having a width of the adhesive-free zone.

Those having skill in the art will recognize that a label, according to the invention, allows one label to be placed on top of another, in such a manner that by tearing away the center section of the outermost label, the center section of the label below the outermost label is exposed and can be removed. In one embodiment, the outermost layer may constitute a shipping label, with one or more labels below constituting other types of forms such as a packing list or a return shipment label. By having the inboard edge of the adhesive pattern on each label being spaced outboard away from the line of weakness by an adhesive-free zone having a width sufficient to preclude having the adhesive pattern from an outer label overlap the center section of a label below, it is unnecessary with a method and apparatus as disclosed herein to resort to various size labels as been required in prior sequentially placed shipping and packing label systems. A substantial advantage for the present disclosure is that all of the various labels can be identical, thereby significantly reducing the complexity and cost in comparison to prior approaches which utilize labels which must decrease sequentially in size from an outermost to an innermost layer.

In another embodiment, a label may further include a pick-point to facilitate separating, and pulling the center section away from the border section along the line of weakness. In another embodiment, the center section may further include a zipper area defined by a zipper line of weakness, in such a manner that the zipper area may be separated and pulled away from the remainder of the center section and the border section along the zipper area line of weakness. The zipper area may further include a flap starter area for facilitating, separating, and pulling the zipper area away from the center section and the border section along the zipper area line of weakness.

In some forms of a label arrangement, having at least a first and a second label, the first label is attached to the substrate by the adhesive pattern on the back side of its border section. The second label is then attached to the front side of the border section of the first label by the adhesive pattern on the back side of the border section of the second label, in such a manner that the second label is superposed over the first label in such a manner that the second label substantially completely covers the first label. Preferably, in labels having a rectangular-shaper periphery, first and second longitudinal edges and first and second transverse edges of the first and second labels are substantially aligned with one another. In some embodiments, however, it may be desirable to rotate the second label with respect to the first label to achieve other alignments between the first and second longitudinal edges and first and second transverse edges of the first and second labels.

In some configurations, the first and second labels are supplied from a single source. The first and second labels may be supplied from a common backing strip. In some forms of the invention, the back side of the center section may also be at least partially coated with a pattern of non-aggressive adhesive. The pattern of non-aggressive adhesive may be utilized, in some forms of the invention, for attaching a packing slip, which may be folded, to the underside of the center section of the label prior to installing the label onto a substrate. In yet other forms of the invention, the pattern of non-aggressive adhesive may be utilized for anchoring other objects to the back side of the center section of a label, with such other objects including but not being limited to: tokens; gift cards; other types of plastic cards; or, computer-readable storage medias such as CDs, or DVDs.

There is also disclosed a combination of a carton defining the substrate, together with a label and packing slip. At least one of the carton, the first label, also referred to as a shipping label, and the packing slip, also referred to as a second label, may include indicia marked thereupon which links indicia on the carton and the first and second labels. Some embodiments may further include at least a third label of construction identical to the first and second labels and operatively attached or attachable to the border section of the second label by the adhesive pattern on the back side of the border section of the third label, in such a manner that the third label is superposed over the second label in such a manner that the third label substantially completely covers the second label. The first and second longitudinal edges and first and second transverse edges of the second and third labels may be substantially aligned with one another in some embodiments of the invention, or the third label may be rotated with respect to the second label in such a manner that the first and second longitudinal and transverse edges are aligned in other arrangements.

The first, second, and third labels may all be supplied from a single source, such as a common backing strip, dispensed from a roll.

Another embodiment of an apparatus and method for applying labels may include an arrangement or step of applying all of the labels with the same label applicator and/or the same label printer, and/or the same label scanner. An arrangement or step of scanning all of the labels and the substrator carton may utilize the same scanner. In another embodiment, all of the arrangements or steps are located and/or carried out at a single location.

In another form of the invention, a label is provided for application to a substrate. The label includes a sheet of material defining a face side and an oppositely facing back side. The sheet also includes a center section attached to a border section disposed outboard from the center section. The center section is attached to the border section by a line of weakness, such as a perforation. The label has an adhesive pattern attached thereto on the back side of the sheet in the border section. The label also has a pattern of non-aggressive adhesive attached on the back side of the center section of the sheet and adapted for attachment thereto of an object. In some forms of the invention, the pattern of non-aggressive adhesive covers at least the entire surface of the back side of the center section. In such a label, the adhesive pattern in the border section may define an inboard edge of the adhesive which is spaced outboard away from the line of weakness by a width of an adhesive-free zone. Such a label may also include a pick point for facilitating separating and moving the center section away from the border section along the weakness. A label having a non-aggressive adhesive in the center section may also include a zipper area defined by a zipper line of weakness, with the zipper area being configured for separation and movement away from the reminder of the center section and the border section along the zipper area line of weakness. Such a zipper area may include a flap starter area for facilitating separation and movement of the zipper area way from the center and border sections.

The invention may take the form of a method for applying a packing slip and a shipping label to a substrate with a single label-applying tamp, in such a manner that the shipping label is visible but the packing slip is hidden by the shipping label until the shipping label is at least partly removed. Where the tamp is selectively movable along a tamp path, such a method, according to the invention, may include the steps of aligning the substrate with the tamp path, and actuating the tamp to apply the shipping label over the packing slip on the substrate. In some forms of the invention, the single tamp may be actuated a first time to apply the first label to the substrate, and then the single tamp may be actuated a second time to apply the second label in a superposed manner over the first label.

In some forms of a method, according to the invention, the first and second labels may be sequentially supplied from the same backing strip. The method may also include printing packing slip information on the first label and shipping information on the second label. The first and second labels may have identical peripheries which are aligned with one another when attached in a superposed manner to the substrate. In some forms of the invention, the same printer may be utilized for printing both the packing slip information on the first label and the shipping information on the second label.

In some forms of a method, according to the invention, the packing slip and shipping label comprise respectively a first and a second label each having a substantially identical sheet of material defining a face side and an oppositely facing back side. The sheets each further include a center section attached to a border section disposed outboard from the center section. The center section is attached to the border section by a line of weakness. The first and second labels may each have an adhesive pattern attached thereto on the back side of the sheets in the border section, with the adhesive pattern having an inboard edge thereof which is spaced outboard away from the line of weakness by an adhesive-free zone having a width of the adhesive-free zone. The first label is adapted for attachment to a substrate by the adhesive pattern on the back side of the border section. The second label is adapted for attachment to the front side of the border section of the first label by the adhesive pattern on the back side of the border section of the second label, in such a manner that the second label is superposed over the first label with the second label substantially completely covering the first label.

In some forms of a method, according to the invention, utilizing a label having a pattern of non-aggressive adhesive attached on the back side of the center section of the sheet and adapted for attachment thereto of the packing slip, a method may further include: attaching the shipping label to the tamp with the front side of the shipping label abutting the tamp and the back side of the shipping label exposed beneath the tamp; attaching the packing slip to the back side of the shipping label while the shipping label is attached to the tamp; and then actuating the tamp a single time to apply the shipping label to the substrate with the packing slip sandwiched between the back side of the shipping label and the substrate. In some forms of the invention, the packing slip may be attached to the back side of the center section of the shipping label with the non-aggressive adhesive prior to actuating the tamp.

A method, according to the invention, may also include folding the packing slip prior to attaching it to the back side of the center section of the shipping label with the non-aggressive adhesive prior to actuating the tamp. A method, according to the invention, may also include printing shipping information on the front side of the shipping label with a first printing arrangement, and printing content information on the packing slip for the second printing arrangement. In some forms of the invention, the packing slip may be folded subsequent to being printed by the second printing arrangement. The folded packing slip may be moved into contact with the non-aggressive adhesive using a pick-and-place arrangement, in some forms of the invention. Where the substrate includes indicia marked thereupon indicative of the shipping information and content information, a method according to the invention may include reading the indicia marked on the substrate, and printing the shipping label and packing slip in accordance with the indicia marked on the substrate.

Another embodiment may further include a conveying arrangement for moving the carton or substrate along a path. A second conveying arrangement may also be utilized for moving the carton or substrate off of the path in accordance with an inspection process. For example, if, during application of the labels to the carton or substrate, the inspection process or system notices an anomaly or a problem, the carton or substrate exhibiting such an anomaly or problem may be diverted off of the path and onto the second conveying arrangement.

Some forms of an apparatus and/or method may also include a weighing arrangement for weighing a carton at a location along the path. In some forms of the invention, the weighing arrangement is configured to weigh a carton while the carton is stopped along the path. Those having skill in the art will recognize that by virtue of utilizing an apparatus and/or method for weighing a carton with the carton stopped along the path, the complexity and cost of an apparatus and/or method according to the invention is substantially reduced over embodiments of the present invention or prior apparatuses and methods which require that a carton be weighed while in motion along a conveyer.

Other aspects, objects and advantages of the invention will be apparent from the following description and accompanying drawings of exemplary embodiments.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention.

DETAILED DESCRIPTION OF EXEMPLARY EMBODIMENTS

Figure 1:
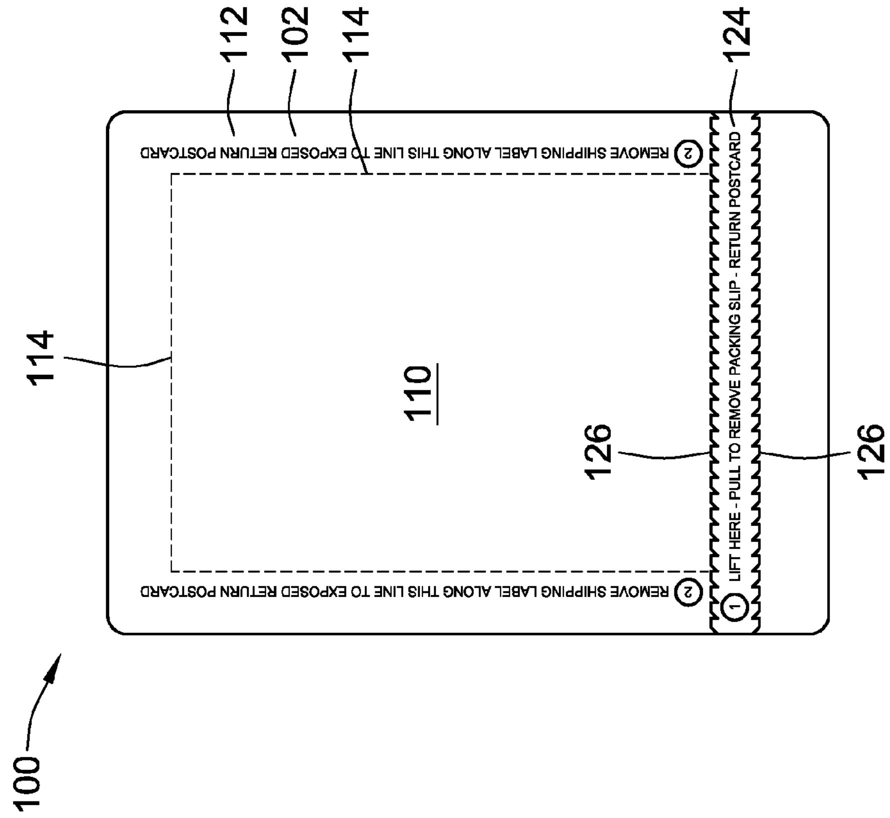
FIG. 1 and FIG. 2 are front and back views respectively of a first exemplary embodiment of a label, according to the invention, having an adhesive-free zone between an innermost edge of an adhesive pattern and a removable center section of the label, and also including a zipper area to facilitate removal of the center section of the label.
Figure 2:
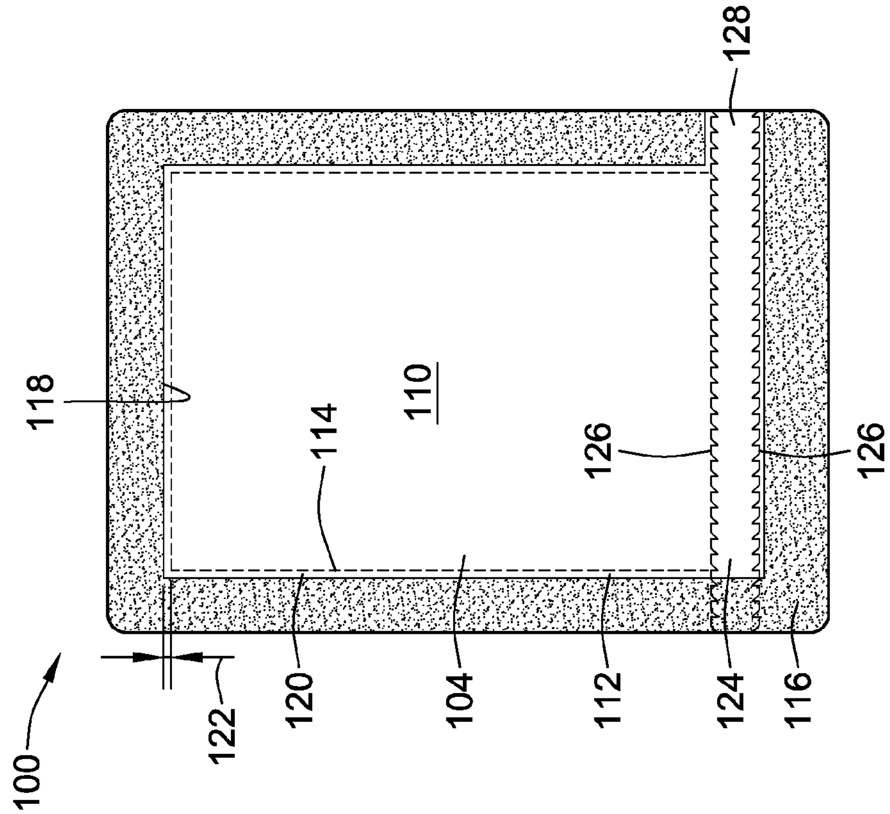

FIG. 1 and FIG. 2 show a front face and a back face of a first exemplary embodiment of a label 100, according to the invention, for application to a substrate 102 and in a superposed registered relationship to another label 100 of identical construction previously attached to the substrate 102, in the manner described in greater detail below with reference to FIGS. 3 and 4.

Figure 4:
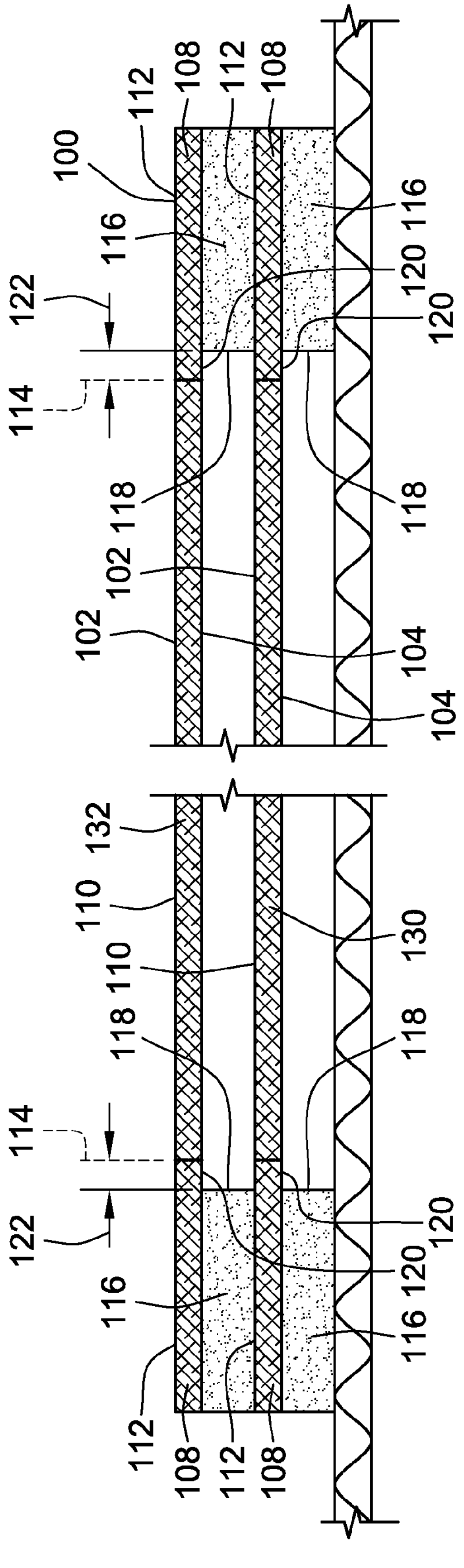
FIG. 4 is an enlarged cross-sectional illustration of the superposed label arrangement shown in FIG. 3.

As best seen in FIG. 4, the first exemplary embodiment of the label 100 includes a sheet of material 108, defining a face side 102 and oppositely facing back side 104. It is contemplated that a label, according to the invention may be made from any appropriate material including, but not limited to, paper; plastic coated paper; or a plastic material.

As best seen in FIGS. 1, 2 and 4, the sheet 108 of each label 100 further includes a center section 110 attached to a boarder section 112 disposed outboard from the center section 110. The center section 110 is attached to the border section 112 by a line of weakness 114, in the form of a perforation extending through the sheet 108, or by any other appropriate form of a line of weakness known in the art. In FIG. 4, the line of weakness 114 is indicated by a vertically extending dashed line.

As shown in FIGS. 2 and 4, the label 100 also has an adhesive pattern 116 attached thereto on the back side of the sheet 108 in the border section 112. The adhesive pattern in FIGS. 2 and 4 is indicated by a shaded or stippled area 116. As further illustrated in FIGS. 2 and 4, the adhesive pattern 116 has an inboard edge 118 thereof which is spaced outboard away from the line of weakness 114 by an adhesive-free zone 120 having a width 122 of the adhesive-free zone 120. It is contemplated that an adhesive-free zone, having a width of about 3-16" might be utilized in exemplary embodiments of the labels 100, 200, 300, 400 disclosed herein. In other embodiments of the invention, however, labels according to the invention may have an adhesive-free zone of another appropriate width.

Figure 6:
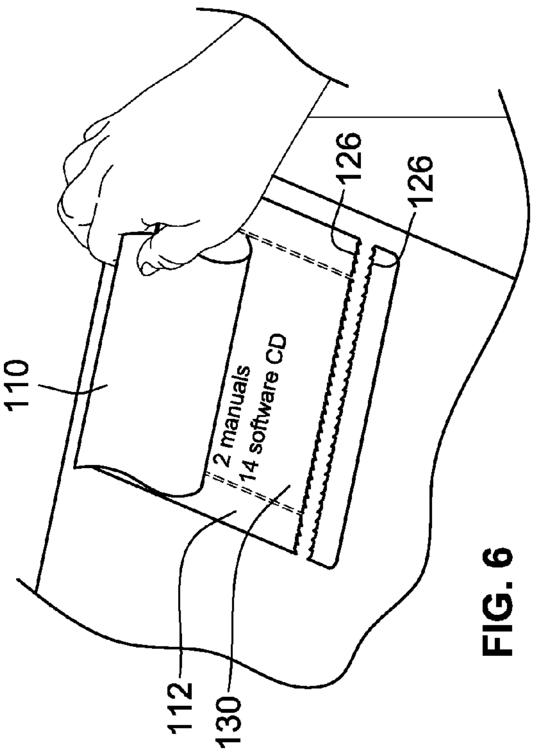
FIGS. 5-7 are sequential illustrations of the manner in which a center section of the superposed labels may be removed.
Figure 5:
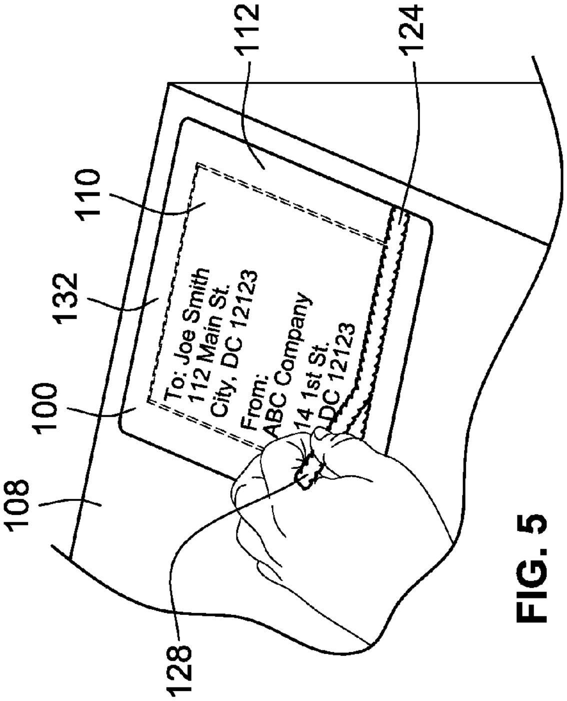
Figure 7:
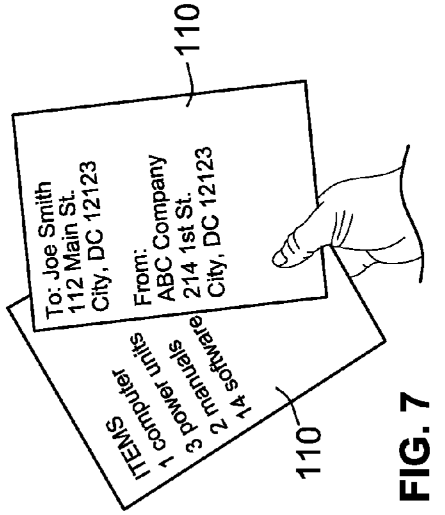

Having the inboard edge 118 of the adhesive pattern 116 spaced outboard away from the line of weakness 114 by the adhesive-free zone 120 greatly facilitates removal of the center section 110 of each of the superposed labels 100, in the manner illustrated in FIGS. 5-7, because the adhesive pattern 116 does not extend beneath the center section 110.

As illustrated in FIGS. 1-3, 5 and 6, the first exemplary embodiment of the label 100 further comprises a zipper area 124 defined by a pair of zipper lines of weakness 126, in such a manner that the zipper area 124 may be separated and pulled away from the reminder of the center section 110 and the border section 112 along the zipper area lines of weakness 126, in the manner known in the art. It will be further noted, with reference to FIG. 2, that in the exemplary embodiment of the label 100, the majority of the zipper area 124 lies within the adhesive pattern 116, in such a manner that the zipper area 124 may be readily pulled free along the zipper lines of weakness 126. As also shown in FIG. 2, the adhesive pattern 116, on the exemplary embodiment of the label 100, has a gap therein (at the lower left-hand corner of the label as depicted in FIG. 2, so that the underside of the zipper area 124 forms a flap starter area, which can be more readily grasped in the manner shown in FIG. 5, for removing the zipper area 124.

Figure 3:
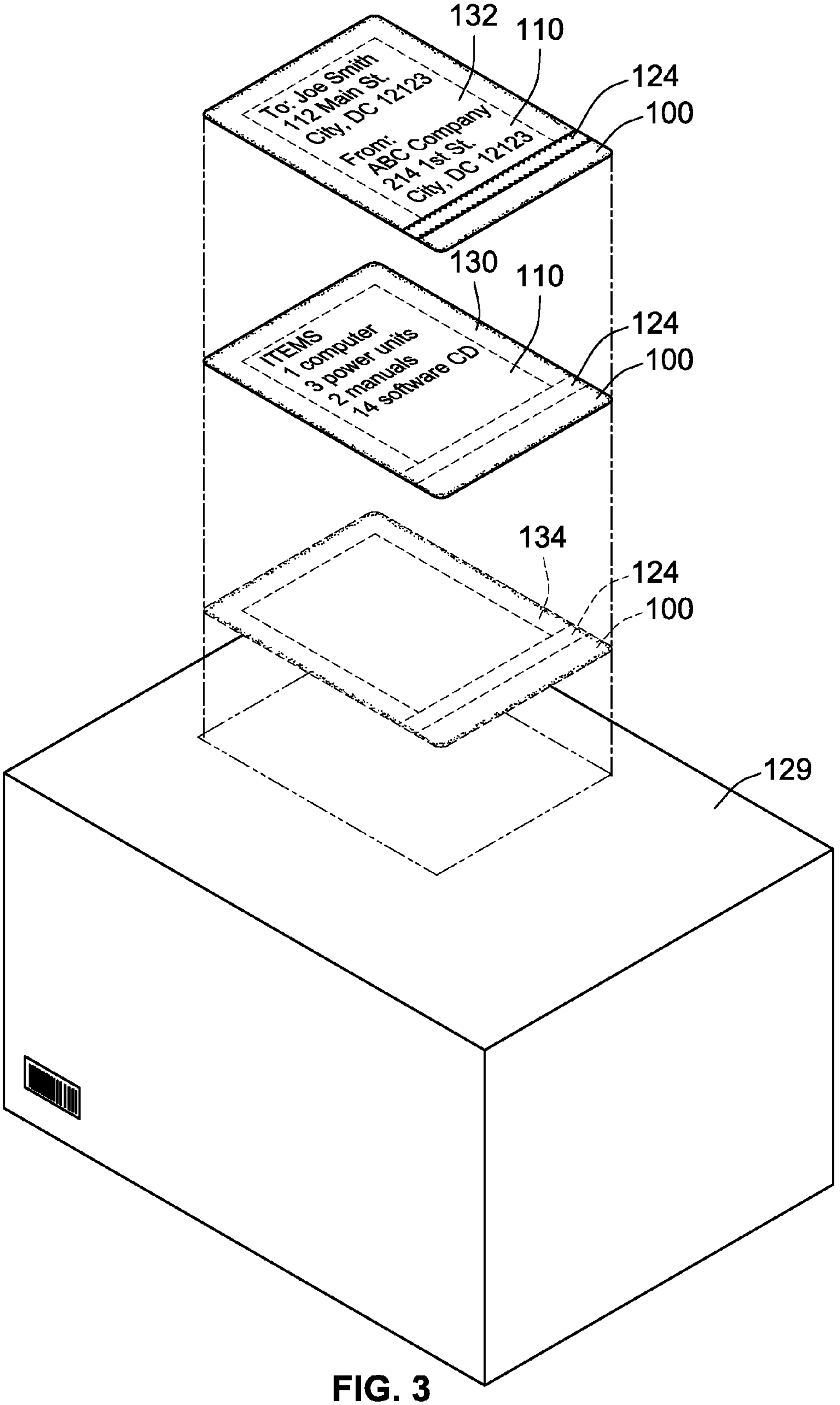
FIG. 3 is an exploded perspective illustration of the application of two or more labels according to FIGS. 1 and 2 on a carton, with a shipping label superposed over the top of a packing slip in such a manner that the packing slip cannot be viewed without removal of a portion of the shipping label.

As shown in FIG. 3, it is contemplated that in some embodiments of the invention, two or more labels 100 may be applied sequentially on top of one another, with their peripheries matched to form the superposed relationship illustrated in FIG. 4. Specifically, with reference to FIG. 3, the center section 110 of a first label 100 may be printed with the contents of a carton 129 having a surface thereof forming the substrate 106. In FIG. 3, this first label is indicated by reference numeral 130. A second label 100 having shipping information printed on the center section 110 thereof, and indicated by reference numeral 132 in FIG. 3, may then be attached in a superposed manner on top of the packing slip 130, with the periphery of the shipping label 132 being aligned with the corresponding periphery of the underlying packing slip 130, to thereby form the superposed structure illustrated in FIG. 4. With the packing slip 130 and shipping label 132 applied in this manner, the information printed on the center section 110 of the packing slip 130 cannot be viewed until the center section 110 of the shipping label 132 is removed in the manner illustrated in FIGS. 5 and 6. Once the center section 110 of the shipping label 132 is removed, in the manner indicated in FIGS. 5 and 6, the center section 110 of the underlying packing slip 130 may be readily removed by virtue of the features of the invention described above.

An embodiment of a label, in accordance with the invention, may be provided with a variety of printed indicia. For example, a face of a shipping label may include printed indicia in the form of instructions, shipper identification, recipient identification, tracking and billing information, target indicia, and scanable indicia of the type well known in the industry, such as UPC bar coding. The instructions may include directions for use and line indicators which assist the recipient in identifying the lines of weakness around the center section of the label. The shipper identification, recipient information, and tracking and billing information may be provided an optical character recognition type font, if it is desired that this information be electronically read and stored, or in other type font as desired, and may be reprinted in multiple different locations as desired by the sender.

The target indicia may be utilized by packing and shipping machinery for printing and applying the shipping labels, to aide in locating the printing, or by the shipping carrier for identifying the labels on the carton for locating and then scanning the information carried thereon. The scanable indicia may be utilized during application of the labels for determining and verifying correct order and billing information and assisting in the routing of the carton both initially to the correct carrier and during shipment by the shipping carrier until deliver. Some of the indicia may be preprinted, such as the instructions, shipper identification and target indicia, or this indicia as well as the remaining indicia may be variable and printed on line for different shipping labels to correspond to a particular carton. In some configurations, the back side of the center section of a label may be preprinted with information such as a return address, a blocking pattern to preclude viewing through the center section, or other desired indicia.

Although it is contemplated that a label according to the invention would be used most advantageously in applications requiring printing on only a single side of the label, those having skill in the art will recognize that a label according to the invention may also be used with efficacy in labeling systems in which duplex printers are used for printing on both sides of the label.

As further indicated in FIG. 3, particularly where it is not desirable to print information on a back side of a label, it may be desirable to install additional labels 100 in a superposed manner, according to the invention. For example, in the arrangement shown in FIG. 3, a third label 134 might be attached to the substrate 106, with the packing slip 130 and the shipping label 132 being sequentially installed over the third label 130. The third label 134 might be utilized for a variety of purposes, such as providing a return shipping label, a coupon, or advertisement, printed on the center section 110 thereof In various embodiments of the invention, the series of labels 100 may be fabricated in any appropriate form. For example, the labels might be formed separately from one another, with each label having its own backing sheet attached on the back side of the label 100, to preclude having the adhesive pattern 116 of one label stick to another label prior to there being applied to a substrate or an underlying label. Alternately, it is contemplated that in higher volume automated or manual printing and applying of labels, that the labels 100 would be attached to a common backing strip, which might be then coiled into a roll of labels.

Figure 9:
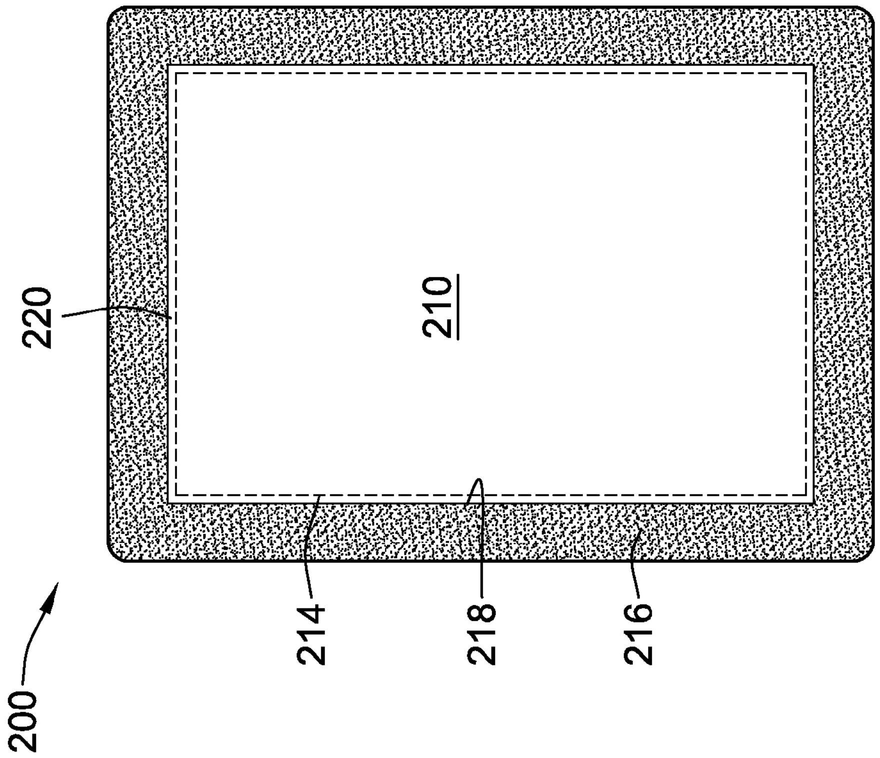
FIGS. 8 and 9 are front and back views of a second exemplary embodiment of a label, according to the invention, wherein a center section of the label includes a pick-point to facilitate separation of the center section of the label from a border of the label extending around center section.
Figure 8:
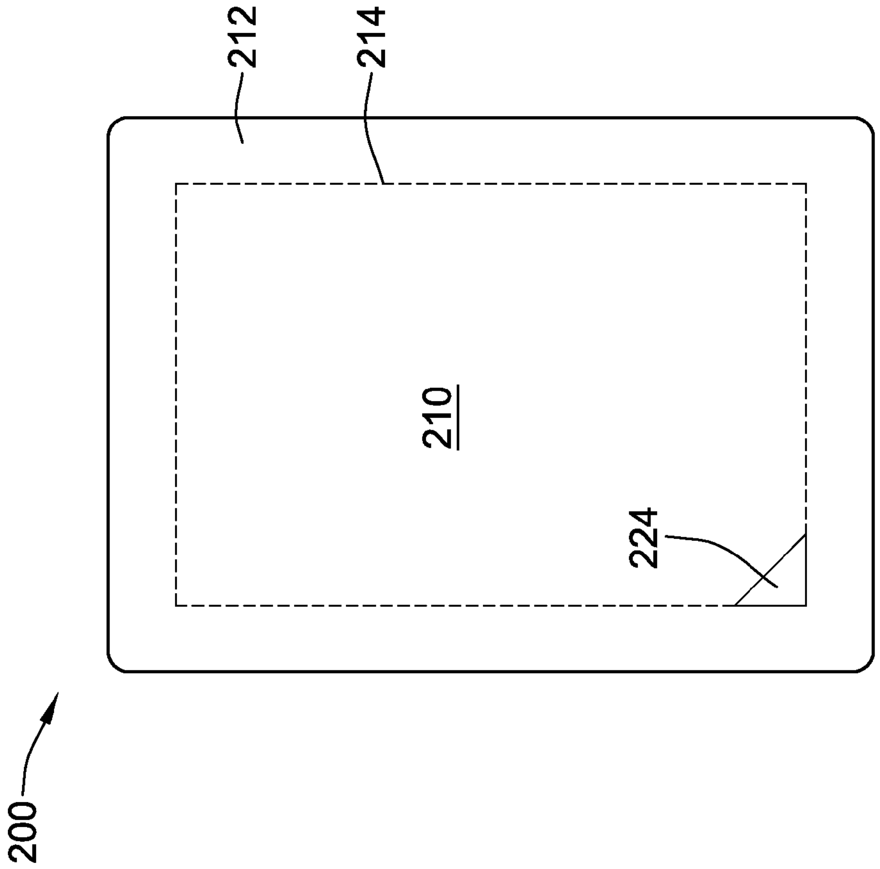

It is contemplated that a label, in accordance with the invention, may take a variety of other forms in other embodiments of the invention. For example, FIGS. 8 and 9 show a front face and a back face respectively of a second exemplary embodiment of a label 200, according to the invention, which does not include a zipper section 124, as described above with reference to the first exemplary embodiment of the label 100. Instead of the zipper section 124 of the first exemplary embodiment of the label 100, the second exemplary embodiment of the label 200 includes a pick point 224, formed by having a corner of the line of weakness 214 be cut entirely through the label, rather than being merely perforated. This allows a person to insert a fingernail under the pick point 224 for removing the center section 210 of the label 200 from the border section 212, generally in the manner indicated in FIGS. 5-7 above. In other respects, the second exemplary embodiment of the label 200 incorporates features described above with reference to the first exemplary embodiment of the label 200, such as having the inner edge 218 of an adhesive zone 216 of the second exemplary embodiment of the label 200 being spaced outboard from the line of weakness 214.

Figure 11:
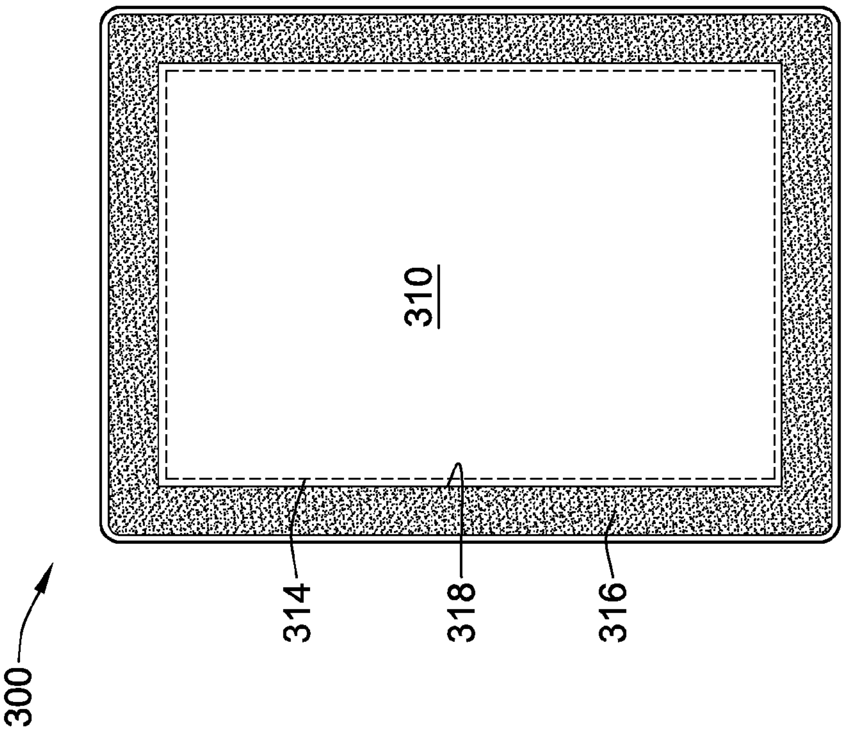
FIGS. 10 and 11 are front and rear views of a third exemplary embodiment of a label, according to the invention, which does not include the pick-point of the label of FIGS. 8 and 9 or the zipper area of the exemplary label for FIGS. 1 and 2.
Figure 10:
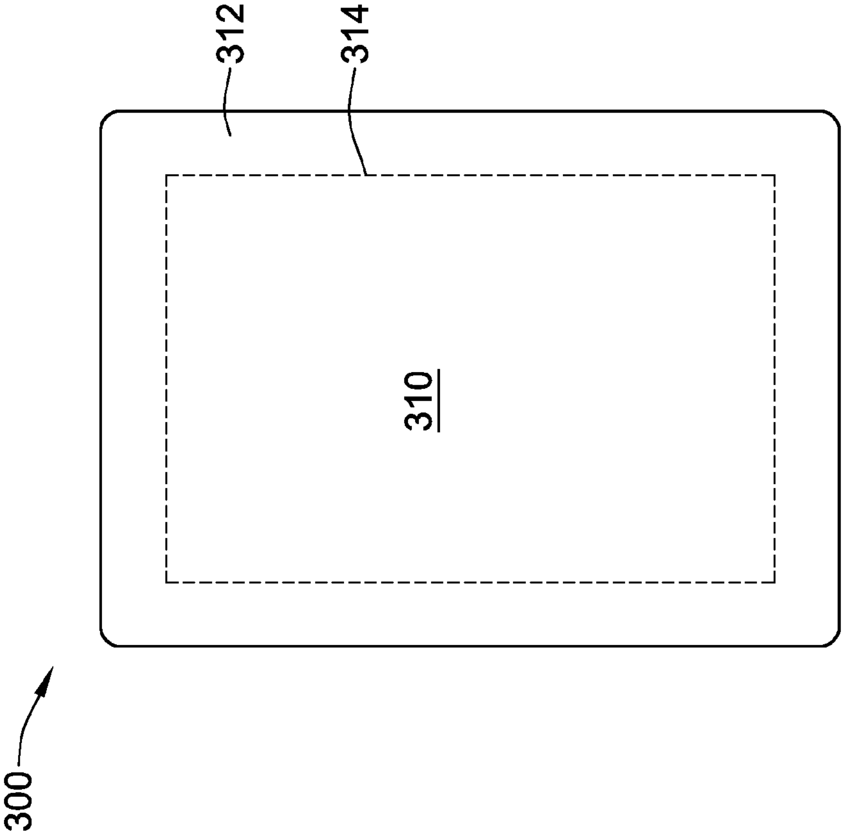

In similar fashion, FIGS. 10 and 11 illustrate a third exemplary embodiment of a label 300, according to the invention, in which no special provisions are made along the line of weakness 314 for facilitating removal of the center section 310 from the border section 312 of the label 300. The innermost edge 318 of the adhesive zone 316 on the back side of the label 300 is spaced outboard from the line of weakness 314, however, in similar fashion to the first and second embodiments of the labels 100, 200 described above. Those having skill in the art will recognize that the invention may be practiced with efficacy in a wide variety of forms other then those exemplary embodiments specifically described herein.

Although the exemplary embodiments of the invention described above will provide substantial improvement over prior label configurations and methods, it is recognized that in some applications it may be desirable to have an area larger than the center sections 110, 210, 310 of the first three exemplary embodiments of labels 100, 200, 300, according to the invention. For example, it is contemplated that it may be highly desirable to utilize a label according to the invention, in applications where a shipping label is used to cover a folded packing slip, or other objects.

Figure 13:
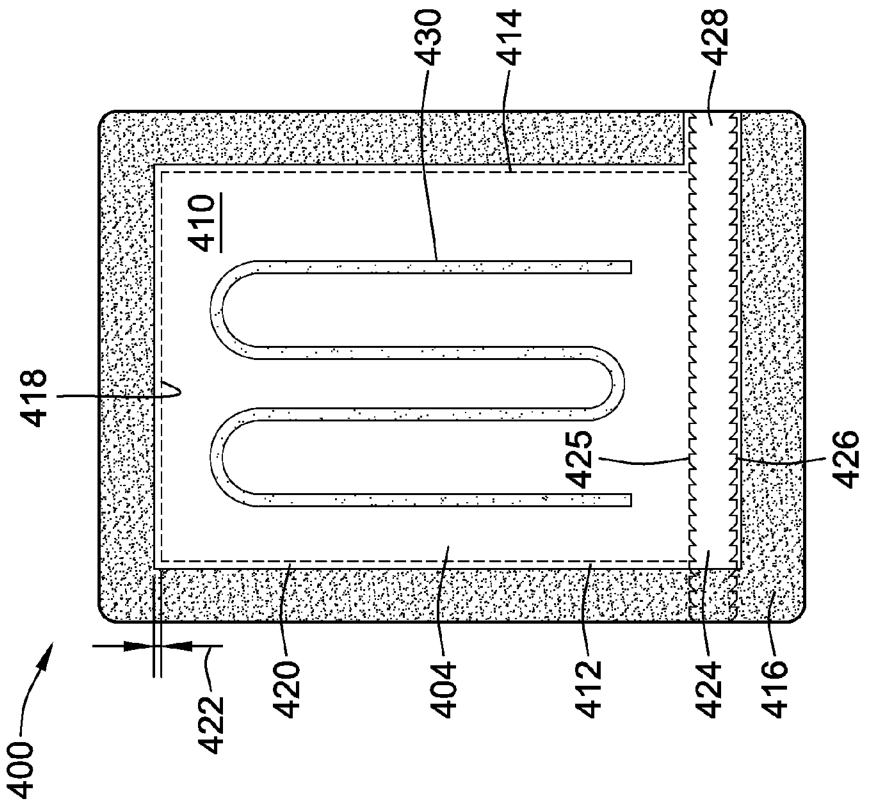
FIGS. 12 and 13 are front and back views of a fourth exemplary embodiment of a label, according to the invention, which is substantially similar to the first exemplary embodiment of FIGS. 1 and 2, except that the fourth exemplary embodiment of the label includes a pattern of non-aggressive adhesive on a portion of the back side of the label, for attachment thereto of an object such as a folded packing slip.
Figure 12:
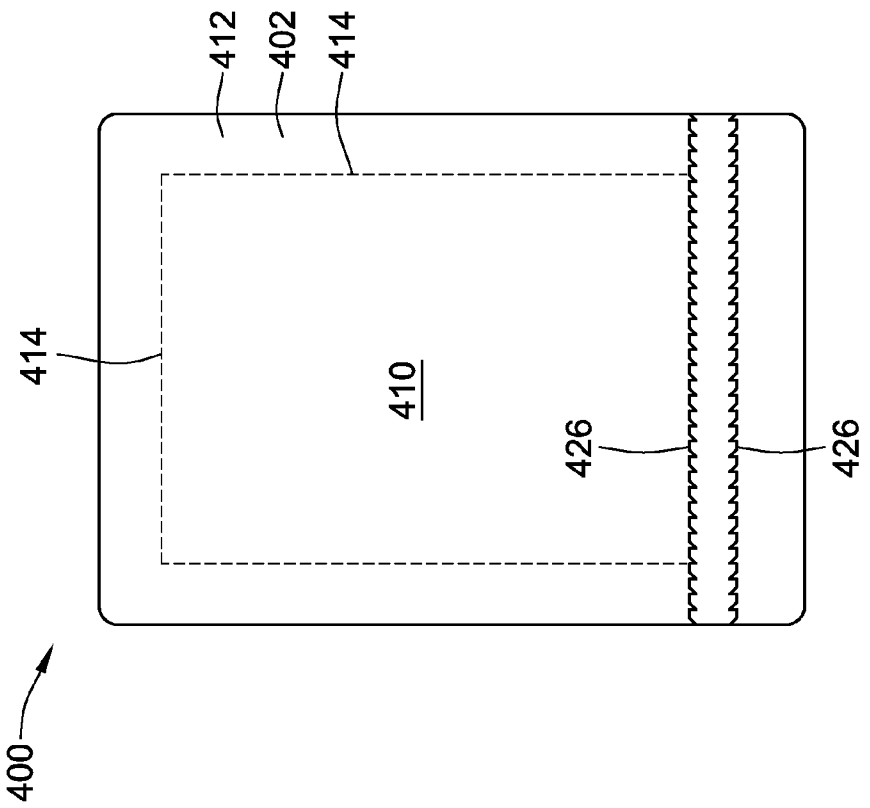

To provide for such applications, FIGS. 12 and 13 show a front and back side 402, 404 of a fourth exemplary embodiment of a label 400, according to the invention. The fourth exemplary embodiment of the invention 400 is generally similar to the first exemplary embodiment of the label 100. Specifically, the fourth exemplary embodiment of the label 400 has an adhesive pattern 416 applied on the back side 404 of the label 400 with an inboard edge 418 of the adhesive pattern 416 being spaced outboard from a line of weakness 414, formed by a series of perforations extending entirely through the label 400. The spacing between the line of weakness 414 and the inboard edge 118 of the adhesive pattern 116 thus forms an adhesive-free zone 420 having a width 422 of the adhesive-free zone 420. The fourth exemplary embodiment of the label 400 also includes a zipper area 424 formed by two zipper lines of weakness 426. The adhesive pattern 416 is also configured to form a gap therein, to provide a flap starter area 428, in the same manner as described above in relation to the first exemplary embodiment of the label 100.

The fourth exemplary embodiment of the label 400 differs from the previous exemplary embodiments of labels 100, 200, 300 in that a pattern of non-aggressive adhesive 430 is applied over at least a portion of the back side of the center section 410. In the embodiment shown in FIG. 13, a serpentine pattern of non-aggressive adhesive 430 is illustrated. In other embodiments of the invention, however, it is contemplated that other patterns may be utilized for the non-aggressive adhesive 430. For example, in some embodiments, the entire back face of the center section 410 may be covered with a non-aggressive adhesive 430. In other embodiments, the pattern of non-aggressive adhesive 430 may also extend into and even cover the entire adhesive-free zone 420, and/or the back side of the zipper area 424. As used herein, the term "non-aggressive adhesive" is intended to mean an adhesive for forming a temporary separable bond between two surfaces. Such an adhesive is similar to the type used for sticking temporary paper or plastic tabs or notes onto a sheet of paper, for example. By way of contrast and explanation, the adhesive patterns 116, 216, 316, 416 used in the border sections 112, 212, 312, 412 of the exemplary embodiments of the labels 100, 200, 300, 400 disclosed herein would preferably be a more aggressive permanent adhesive.

Figure 14:
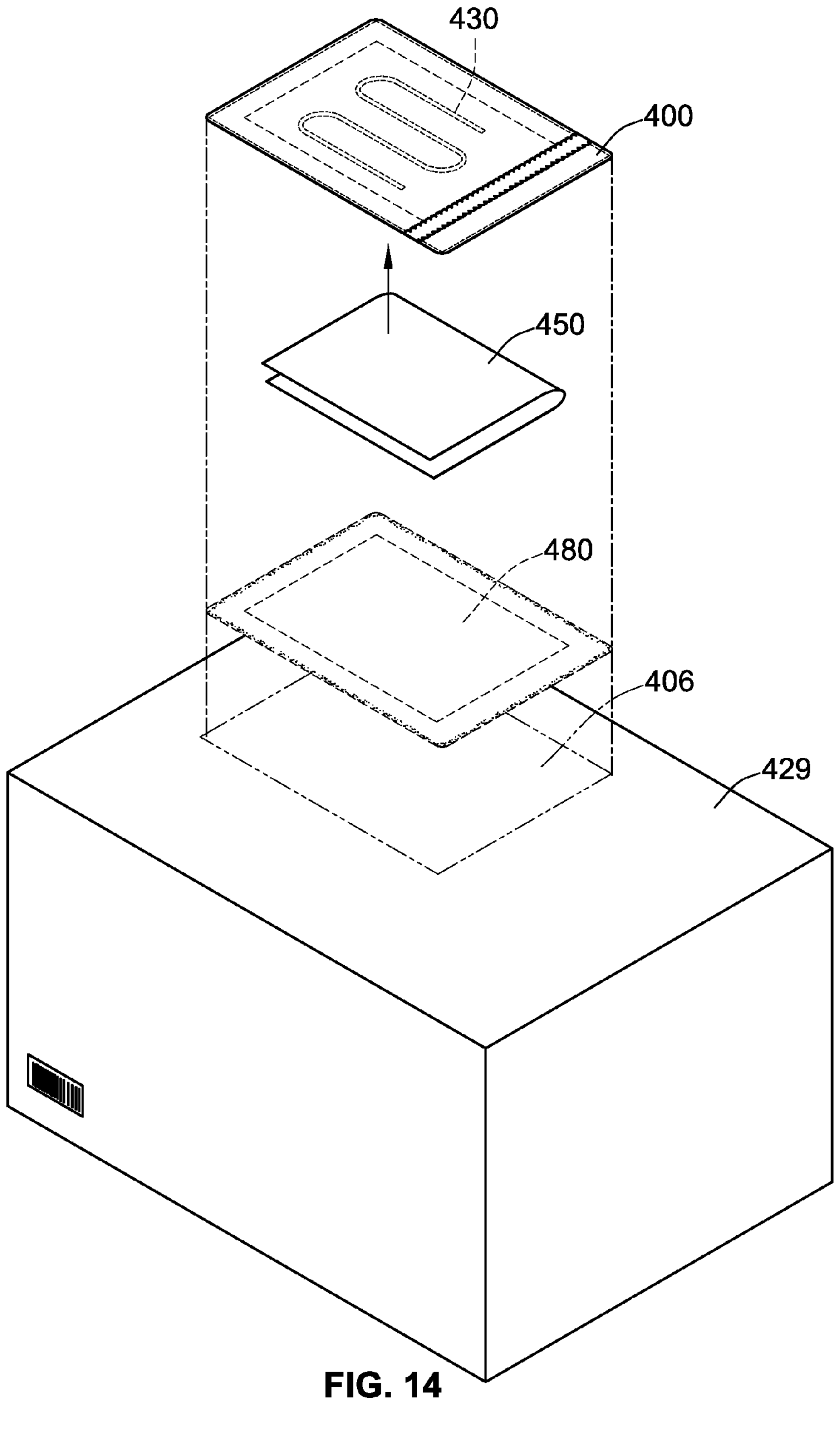
FIGS. 14 and 15 are partly exploded perspective illustrations showing the manner in which a folded packing slip may be attached to the non-aggressive adhesive on the back side of a label according to FIGS. 12 and 13, prior to simultaneously applying the label and folded packing list to a substrate such as a surface of a carton.
Figure 15:
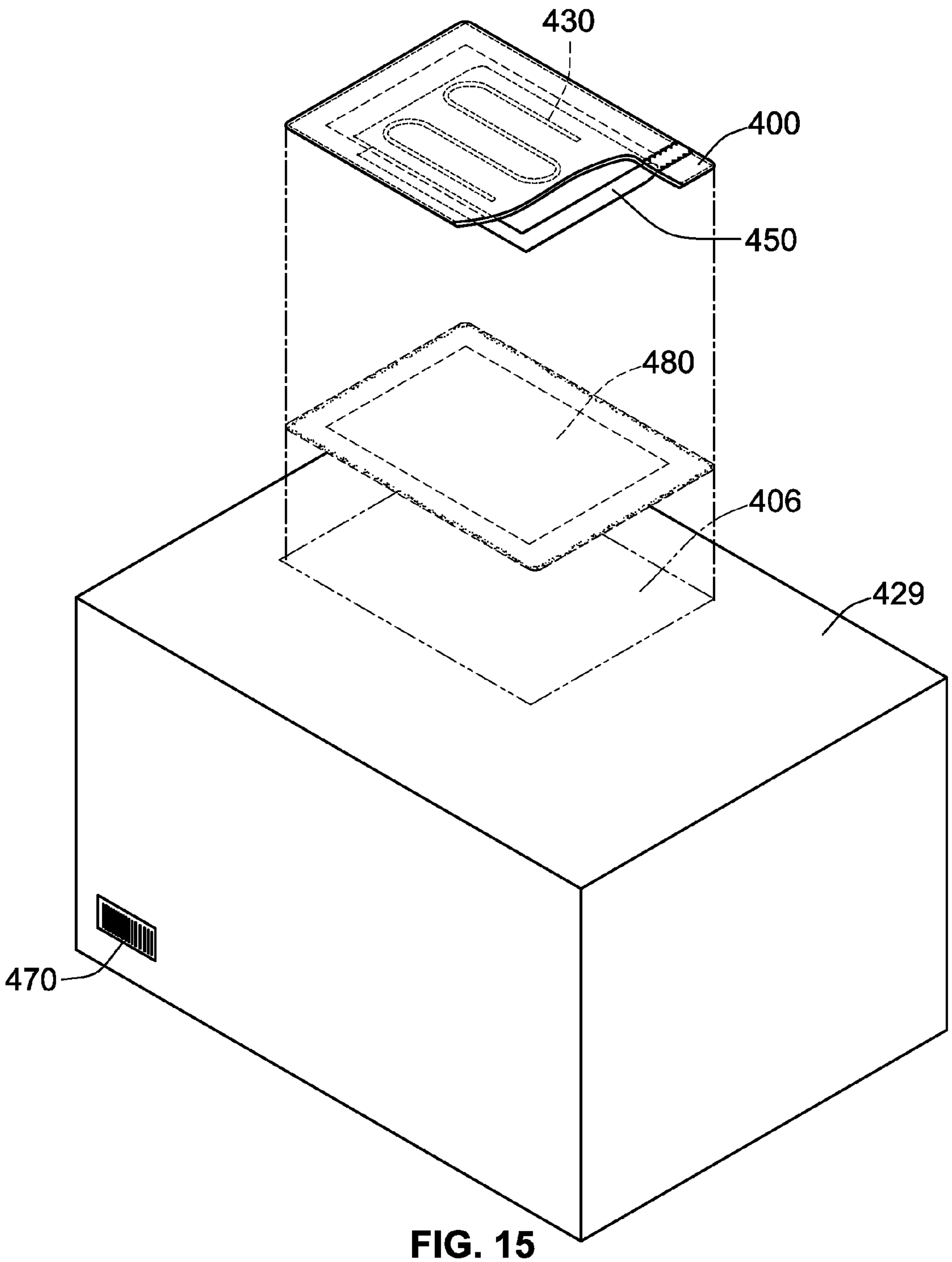
Figure 16:
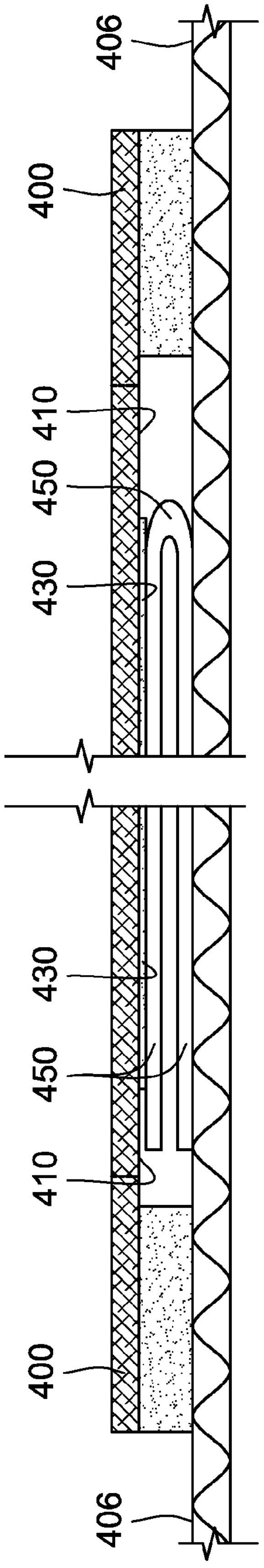
FIG. 16 is an enlarged schematic illustration of a folded packing slip disposed beneath a label and a substrate, in accordance with the illustrations of FIGS. 14 and 15.

By virtue of this configuration, an object, such as a folded packing list 450 may be attached to the back side 404 of the center section 410 of the label 400 by the pattern of non-aggressive adhesive 430 prior to applying either the label 400 or the packing slip 450 to the substrate 406 of a carton 429, in the manner illustrated sequentially in FIGS. 14-16. The label 400, with the folded packing slip 450 temporarily attached thereto by the non-aggressive adhesive 430 may then be applied in a single step to the substrate 406, in the manner illustrated in FIG. 16.

Figure 18:
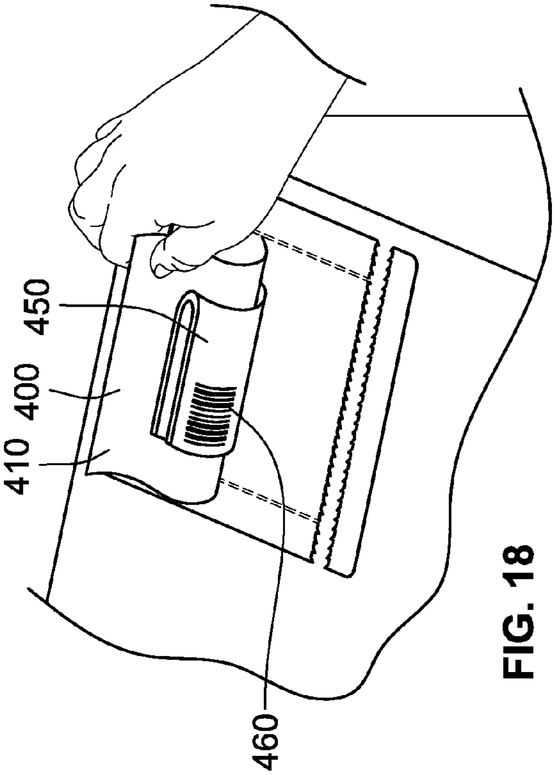
FIGS. 17-19 are schematic illustrations of the manner in which a center section of the label of FIGS. 12-16 may be removed to provide access to a folded packing list.
Figure 17:
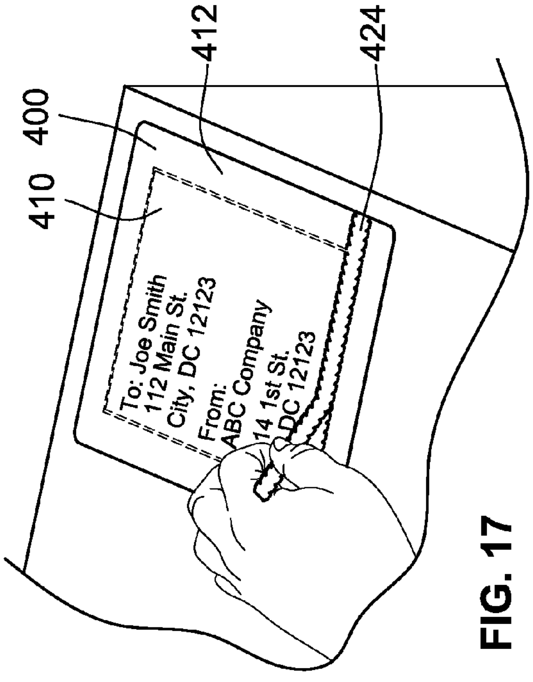
Figure 19:
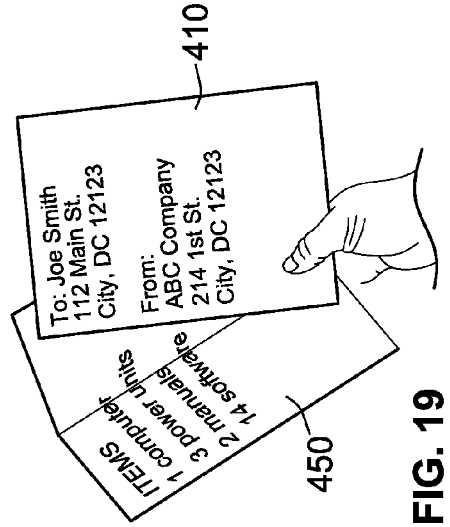

With this arrangement, the folded packing slip 450 is completely hidden from view until the center section 410 of the overlying label 400 is separated from the border section 412 of the label 400, in the manner illustrated in FIGS. 17-19. Once the center section 410 of the label 400 is removed from the border section 412, the folded packing list 450 may be readily peeled away from the back side of the center section 410 of the label 400 and unfolded to its full extent in the manner illustrated in FIG. 19.

It will be noted that although the folded packing slip 450 shown in FIGS. 14-16, and FIGS. 18 and 19 is folded only once, in other embodiments of the invention a packing slip may be folded multiple times before being applied to the back side of the center section 410 of the label 400. In this manner, the invention allows a letter-size (8½×11 inch) packing list to be conveniently applied and covered by a much smaller label.

As shown in FIG. 18, in some embodiments of the invention it may be desirable to fold the packing list 450 in such a manner that an indicia, such as a bar code 460 remains visible on the outside of the folded packing slip 450. Such an arrangement may be advantageous in automated packing applications having a verification scanner positioned to read such a bar code 460 just prior to applying the combined label

400 and folded packing slip 450 to the substrate 406. In such an arrangement, the carton 429 may also include a bar code or other indicia 470 which can be utilized by such automated packing equipment for retrieving, shipping and packing information to be printed on the label 400 and packing slip 450, and for verifying that the correct address and packing slip are being applied to the carton 429 through the use of verification scanners at the time that the combined label 400 and packing slip 450 are actually applied to the carton 429.

As further illustrated in FIGS. 14 and 15, in some embodiments of the invention utilizing a label 400 having an object such as a folded packing list 450 attached to the back face of the center section 410 of the label 400, it may be desirable to install a second, or multiple additional labels 480 beneath the folded packing list 450 or object, in a superposed manner with the outermost label 400.

Figure 20:
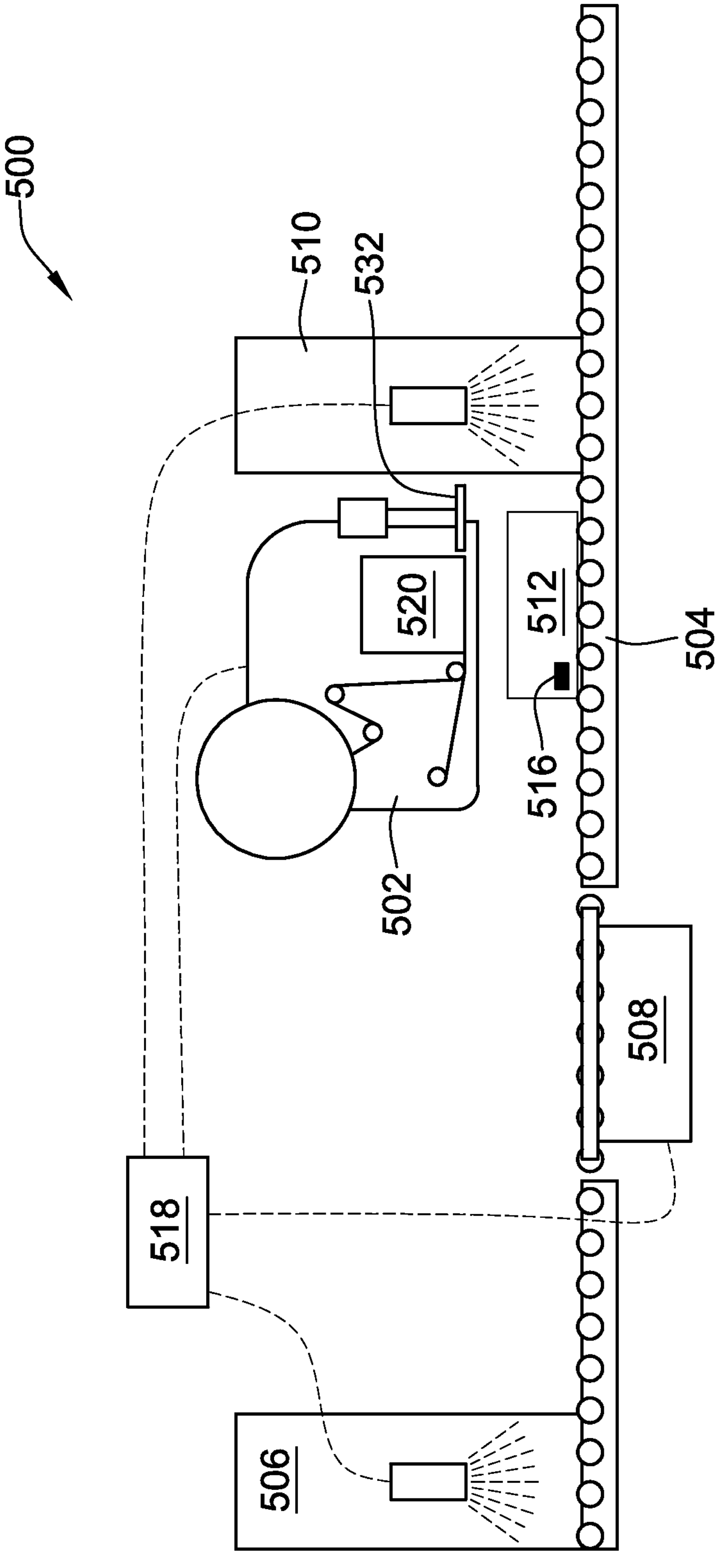
FIGS. 20 and 21 are schematic elevation and plan views of a first apparatus for applying labels in a superposed relationship, in accordance with the invention.
Figure 21:
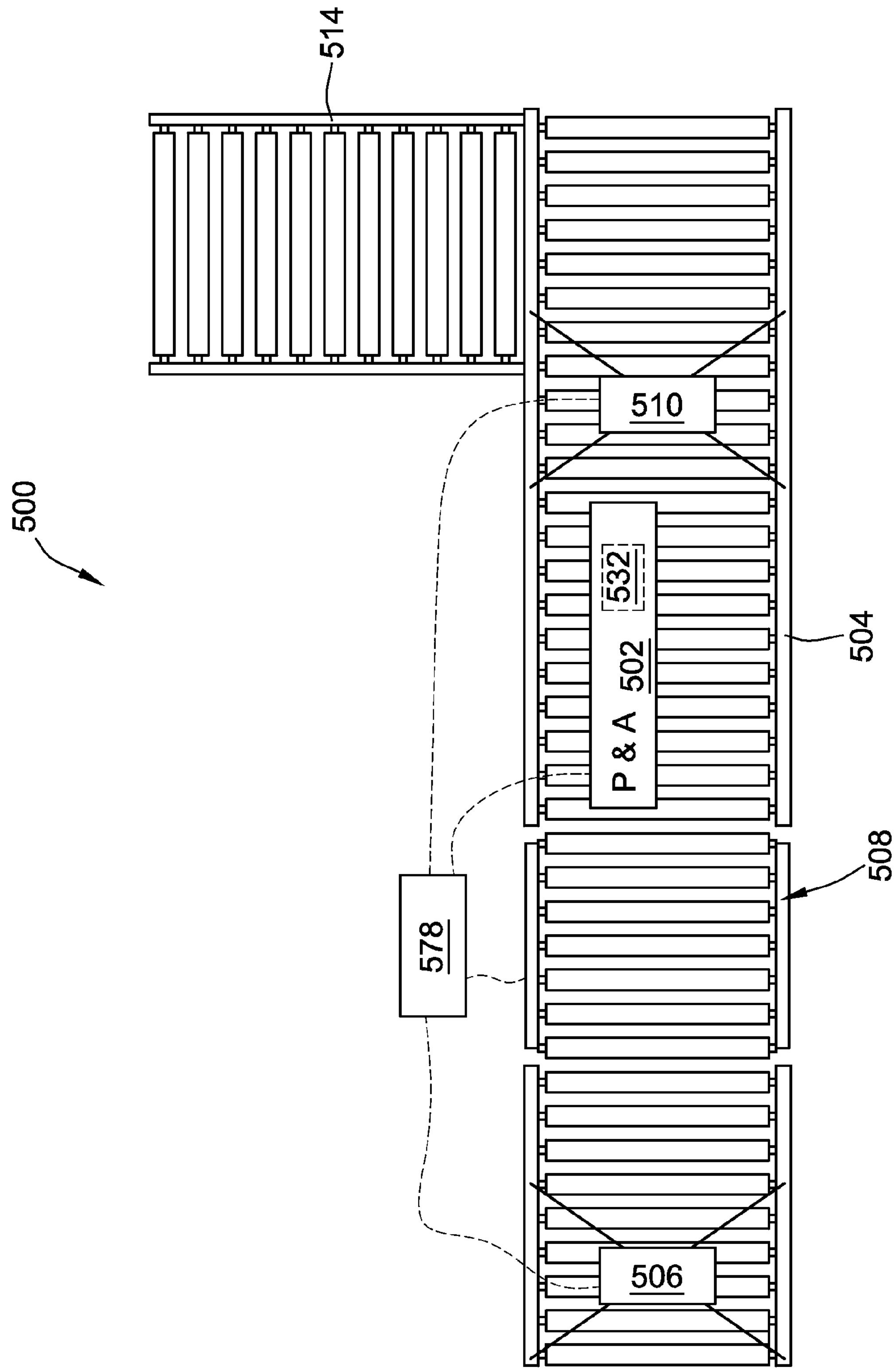
Figure 22A:
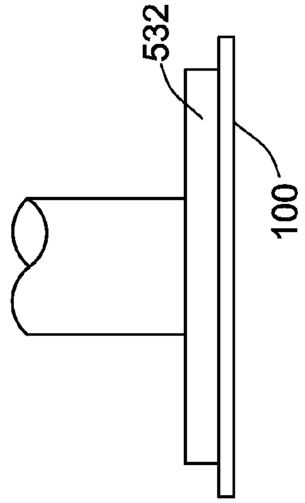
FIGS. 22 and 22*a* are enlarged schematic illustrations of portions of the apparatus of FIGS. 20 and 21, showing structural and operational details of the first exemplary embodiment of the apparatus shown in FIGS. 20 and 21.
Figure 22:
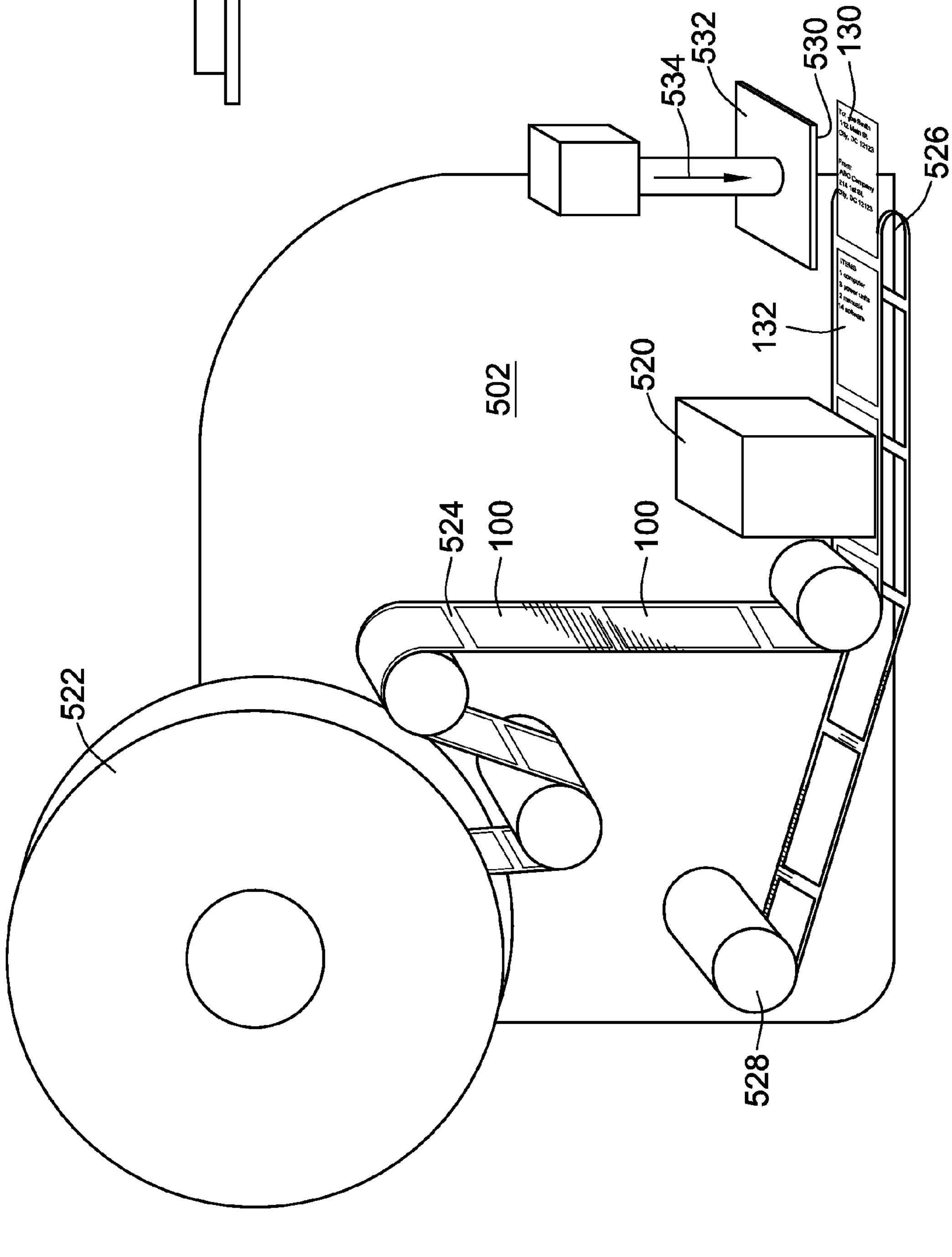

FIGS. 20 and 21 show a fifth exemplary embodiment of the invention, in the form of an apparatus 500 for applying labels in a superposed manner, according to the invention at a single print-and-apply station 502 along a conveyor 504. As shown in FIG. 22, the print-and-apply station 502 includes a supply roll 522 having a web of backing material 524 extending along a path which directs a series of labels 100 to the printer 520. After exiting the printer, the printed labels 130, 132 continue to travel along a path with the backing web 524. The path traveled by the backing web 524 makes a sharp bend 526 at one point along the path. As the backing web 524 makes this sharp bend, the printed labels 130, 132 separate from the backing web and continue to travel in a substantially straight line, to the right as shown in FIG. 22, while the backing web 524 travels back to the left and is coiled around a take up roll 528. As the printed labels 130, 132 continue to the right, they move beneath a lower surface 530 of a tamp 532. The tamp 532 includes vacuum ports in the lower face 530 of the tamp 532, which grasp the printed (front) face of each of the labels 130, 132 successively in the manner indicated in FIG. 22*a*. The tamp 532 is selectively actuable, as indicated by arrow 534 in FIG. 22 for moving the label attached to the floor face 530 of the tamp along the actuation path 534 and into close proximate and/or contact with an upper surface of the carton 512, as illustrated in FIG. 20.

In accordance with a method, according to the invention, the carton 512 is aligned with the tamp path 534 and preferably stopped in that position during sequential applications of a first and a second label 130, 132 in a superposed relationship according to the invention.

Once the first label, printed with the packing list 130 has been grasped by the lower surface 530 of the tamp 532, the tamp 532 is actuated and moves along the tamp path 534 to apply the first label to the upper surface of the carton 512. Transfer of the first label 130 from the tamp 532 to the upper surface of the carton 512 can be accomplished in any appropriate manner known in the art, including pressing the label against the upper surface of the carton 512 with the tamp, cutting off vacuum to the lower surface 530 of the tamp when the tamp 532 is positioned in close proximity to the upper surface of the carton 512, and/or applying a blast of pressurized air at the lower surface 530 of the tamp 532 to thereby separate the label 130 from the tamp 532 and press it into contact with the upper surface of the carton 512.

The first exemplary embodiment of the apparatus 500 shown in FIGS. 20 and 21 includes an induction scanner 506, a pop up scale 508, the print-and-apply station 502, and a verification scanner 510, disposed sequentially along a path of travel for a carton traveling from left to right along a path over the conveyor 504. Some forms of the invention may also include a dimensional scanner (not shown), either as a stand-alone unit or as a part of the induction or verification scanners 506, 510. At the right end of the path, as shown in FIGS. 20 and 21, the apparatus 500 also includes a diversion conveyor gravity exception lane 514 and other equipment for alternatively diverting cartons to the left (as shown in FIG. 20), off of the path onto the diversion conveyor gravity exception lane 514, or moving the cartons straight along the path toward the right (as shown in FIG. 20).

In the first exemplary embodiment of the apparatus 500, the pop-up scale 508 is mounted to the conveyor frame. The pop-up scale 508 is used for measuring the weight of the carton 512 while it is stopped on the conveyor 504 above the scale 508. The scale arrangement of the exemplary embodiment has a series of bars (not shown) which extend upward between rollers on the conveyor 504 to raise the carton 512 above the rollers for measurement of the weight of the carton 512 by the scale 508. When the scale 508 is not in use, the bars retract below the surface of the rollers of the conveyor 504 so that they do not contact carton 512 moving along the path on the conveyor 504.

With the exemplary embodiment 500, a carton 512 moving along the path stops beneath the print-and-apply station 502. Indicia 516 printed on the carton 512, or a tag attached to the carton 512 is read by the verification scanner 510. The verification scanner 510 feeds information scanned from the carton 512 to a controller 518. The term "controller," as used herein, is intended to include any appropriate form of a control arrangement, for example a programmable logic control, a microprocessor, or a computer programmed and operatively connected for controlling the apparatus 500. The controller 518 can communicate with components of the apparatus 500 over a hard-wired network, a wireless network, for example Bluetooth, RF, and optical network.

The controller of the apparatus may also include a computer readable medium having instructions for carrying out any step or control of any apparatus or arrangement as disclosed herein.

The controller 518 retrieves necessary information and sends a signal to the printer 520 of the print-and-apply station 502. As shown in FIG. 22, the printer 520 prints a packing list for the contents of the carton 512 onto a first label 130, according to the invention.

The verification scanner 510 then scans the first label 130, and preferably using indicia printed on the first label 130 corresponding to the contents of the carton 512, verifies that the packing slip 130 is applied to the correct carton 512.

The same printer 520 of the print-and-apply station 502 is utilized for printing a second label 132 with indicia in the form of shipping information. The print-and-apply station 502 then applies the second label 132, bearing the shipping information, on top of the previously applied first label 130 having indicia in the form of the packing slip. The verification scanner 510 then reads indicia on the shipping label 132, which is compared by the controller 518 to information recorded from scans of the indicia 516 on the carton 512 and the packing slip 130. If all of the indicia verified by the scanner 510 matches information on computer readable media in the controller 518, the carton 512 then continues to move to the right along the path on the conveyor system 504.

If the verification scanner 510 and controller 518 detect an anomaly or problem with the scanned indicia, the carton 512 is diverted to the left, off of the path, onto the diversion conveyor gravity exception lane 514.

Figure 23:
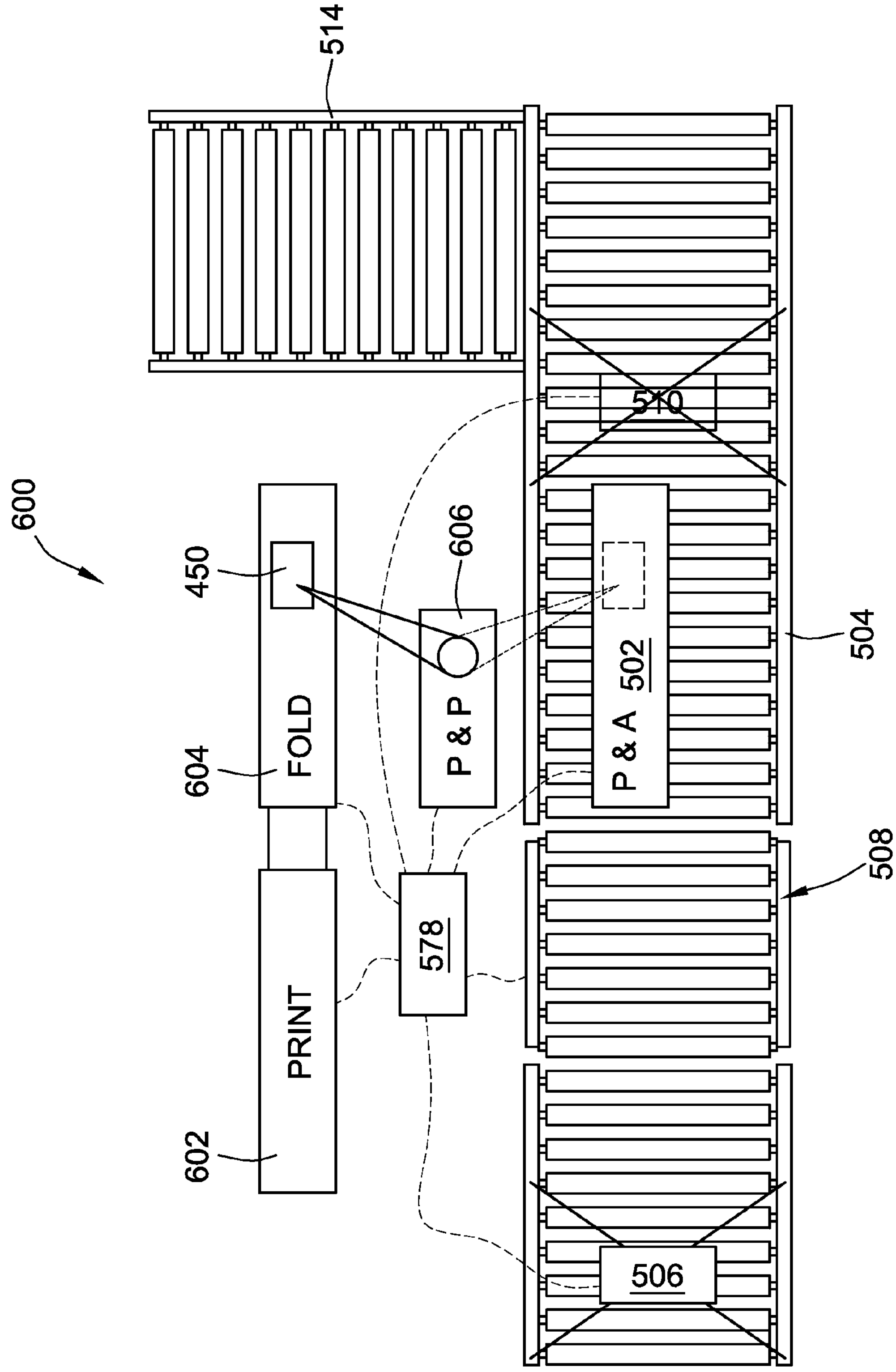
FIG. 23 is a schematic plan illustration of a second exemplary embodiment of an apparatus, according to the invention, for applying a folded packing slip beneath a label on a substrate such as a carton, in accordance with the invention.

FIG. 23 depicts a sixth exemplary embodiment of the invention, in the form of a second exemplary embodiment of an apparatus 600, according to the invention, for applying labels to a carton in a superposed relationship with a folded packing slip, or other object disposed between the packing slip and a substrate of the carton. In general, the second apparatus 600 utilizes many of the same components described above with regard to the first exemplary embodiment of the apparatus 500. Accordingly, only those new components added in the second apparatus 600 will be given new reference numerals, with the components which are common to both the first and second embodiments of an apparatus 500, 600 carrying the reference numerals previously given to them above.

As shown in FIG. 23, the second exemplary embodiment of the apparatus 600 includes a second printer 602, a folder 604, and a pick-and-place machine 606, in addition to the components described above in relation to the first exemplary embodiment of the apparatus 500. The printer 602, folder 604 and pick-and-place machine 606 are all operatively connected to the controller 518, to print, fold and transport a folded packing list 450 from the folder 604 into contact with the pattern of non-aggressive adhesive 430 on the bottom face of a label 400 supported on the lower face 530 of the tamp 532.

Figures 24, 24A:
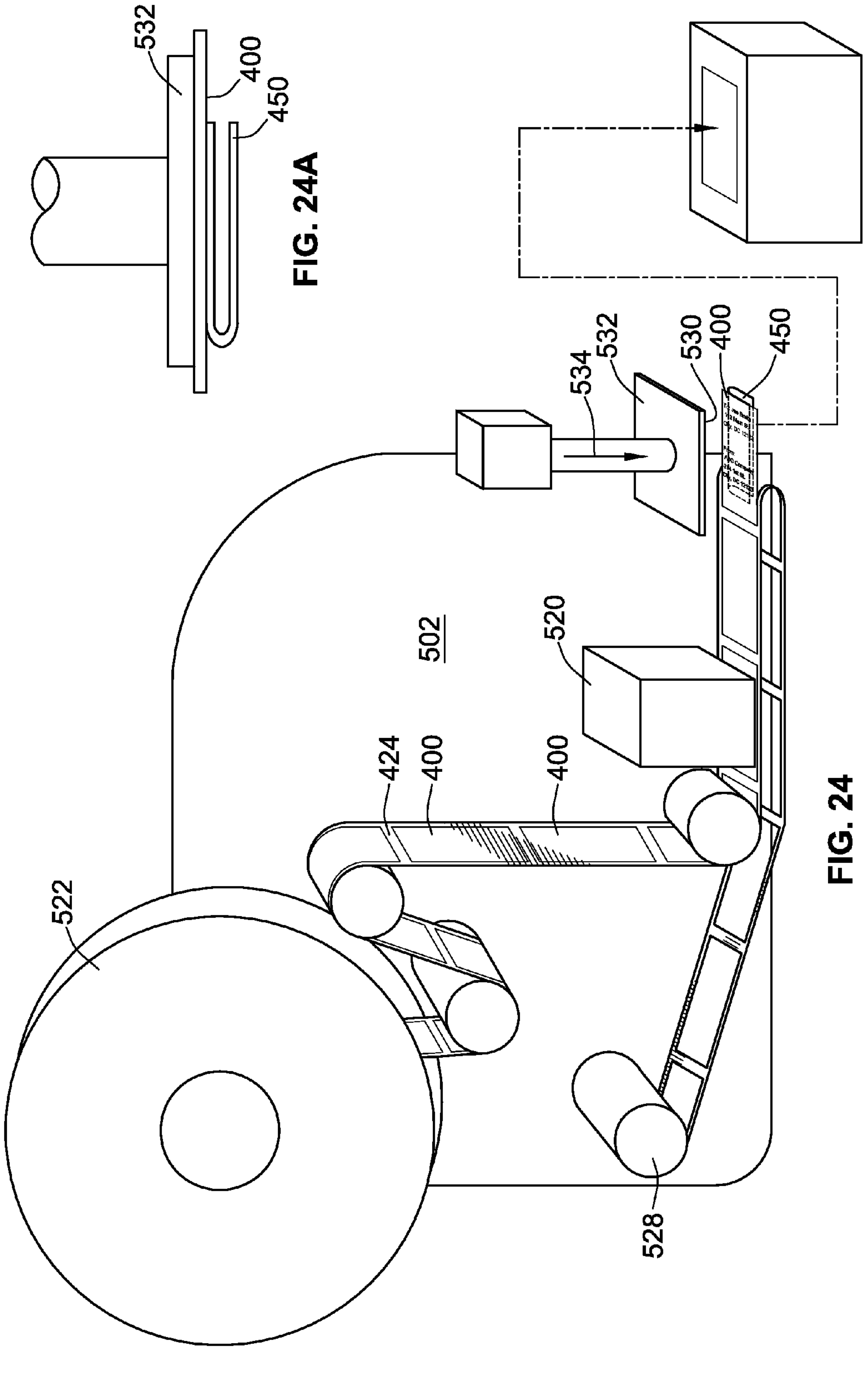
FIGS. 24 and 24*a* are enlarged views of portions of the second exemplary embodiment of the apparatus shown in FIG. 23, illustrating structural and functional details of the invention.

As shown in FIG. 24, the labels 400 are carried on a common backing web 424 in the same manner as the labels 100, as described above with reference to FIG. 22. In the second exemplary embodiment of the apparatus 600, the labels 400 are each printed with shipping information, by the printer 520, corresponding to information supplied from the controller 518 in accordance with the indicia on a given carton, in generally the same fashion as described above with regard to the first exemplary embodiment of the apparatus 500. With the second apparatus 600, however, the packing lists 450 are supplied to the tamp 532 by a separate path extending through the second printer 602, the folder 604 and the pick-and-place arrangement 606. The printer 602 receives information from the controller 518, in accordance with the indicia on the carton as detected by the induction scanner 506. The printed labels 450 are folded by the folder 604 and placed into the center section 410 of the label 400, as shown in FIG. 24*a*, prior to the tamp 532 being actuated a single time along the tamp path 534 to simultaneously move the printed shipping label 400 with the packing list 450 attached thereto and apply the combined label 400 and packing list 450 to the surface of the carton.

Those having skill in the art will recognize that having an apparatus and method, in accordance with the invention, operating as described above with relation to the second exemplary embodiment of the apparatus 600 provides substantial savings in time and expense over prior approaches to attaching a folded packing list to a substrate or carton with a shipping label. It will also be very apparent, that the invention allows application of both the folded packing list and shipping label with one pick-and-place machine, and without additional manual labor required by prior approaches.

In the existing labeling systems, operators are required to manually perform the application of the shipping label and identifying and hand applying the packing slip to the proper carton. Operators must find and match the packing list, fold and insert it into a pouch and apply the pouch to the final order carton. This process is time consuming and prone to error.

It will be understood that the elements and components of the invention may be combined in a variety of ways other than those expressly described in relation to the exemplary embodiments disclosed herein.

For example other embodiments of the invention may include a dimensional scan station positioned in the conveyor system. Like the weight station, the data obtained from the dimensional scan station can be transmitted to the customer for informational purposes and can be used as quality audit information. If the quality audit of the product does not conform to its predetermined size, it would be diverted off-line for manual evaluation and processing.

As mentioned above, a programmable logic controller may include computer readable media which includes instructions for controlling the an apparatus or method according to the invention in any or all operation performed in practicing the invention. In addition, the computer readable media may also contain information relating to the various cartons being processed and to shipping information received from customers. It is contemplated that the computer readable media of a programmable logic controller might maintain shipping information and customer information in an on-board database and receive real time information from customers on an on-going basis.

Those having skill in the art will readily recognize that by virtue of the above described configuration of the exemplary embodiments, only a single print-and-apply station and verification scanner are required for practicing the invention. This offers substantial improvement over prior approaches which require multiple verification scanners, printers, and apply stations. Even greater improvement is provided through practice of the invention in comparison to prior approaches which required duplex printers for printing on both sides of a label. It will be understood, however, that the invention is not limited to apparatuses and methods utilizing only a single print-and-apply station. It is contemplated that the invention may also be practiced with efficacy and advantage over prior approaches in apparatuses and methods using more than one print-and-apply station.

For purposes of this disclosure, the term "coupled" means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or the two components and any additional member being attached to one another. Such adjoining may be permanent in nature or alternatively be removable or releasable in nature.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the apparatus or method in this disclosure.

Preferred embodiments are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A label arrangement, comprising:

a first and a second label each having a substantially identical sheet of material defining a face side and an oppositely facing back side, the first label having different information printed thereon than that printed on the second label;

the sheet further including a center section attached to a border section disposed outboard from the center section, with the center section being attached to the border section by a line of weakness;

the first and second labels each having an adhesive pattern attached thereto on the back side of the sheet in the border section, with the adhesive pattern having an inboard edge thereof which is spaced outboard away from the line of weakness by an adhesive-free zone having a width of the adhesive-free zone;

the first label being adapted for attachment to a substrate by the adhesive pattern on the back side of the border section; and the second label being adapted for automated attachment to the front side of the border section of the first label by the adhesive pattern on the back side of a border section of the second label, in such a manner that the second label is superposed over the first label with the second label substantially completely covering the first label;

wherein, the first and second labels are supplied from a single source;

wherein the first and second labels are supplied from a common backing strip configured to present the first and second labels sequentially for automatic removal from the backing strip and subsequent application to a substrate; and wherein the common backing strip is configured to be attached to machine-powered rollers to facilitate automated placement of the first and second labels, the first and second labels being removably attached to the common backing strip using adhesive.

2. The label arrangement of claim 1, wherein:

the first and second sheets each define respective substantially identical peripheries thereof; and the peripheries of the first and second labels are substantially aligned with one another when the second label is attached to superpose the first label.

3. The label arrangement of claim 2, wherein:

the periphery of each of the first and second labels defines orthogonally oriented spaced first and second longitudinal edges and spaced first and second transverse edges thereof; and the corresponding first and second longitudinal edges and the corresponding first and second transverse edges of the first and second labels are substantially aligned with one another when the second label is attached to superpose the first label.

4. The label arrangement of claim 1, wherein the front side of a center section of the first label is printed with indicia including a packing slip, and the front side of a center section of the second label is printed with indicia including shipping information.

5. The label arrangement of claim 1, further comprising at least a third label of construction identical to the first and second labels and operatively attached to the border section of the second label by an adhesive pattern on the back side of a border section of the third label, in such a manner that the third label is superposed over the second label whereby the third label completely covers the second label.

6. The label arrangement of claim 5 wherein the first, second and third labels are supplied from a single source, the third label having printed thereon information different from that printed on either the first or second label.

7. The label arrangement of claim 6, wherein the first, second and third labels are supplied from a common backing strip configured to present the first, second, and third labels sequentially for automatic removal from the backing strip and subsequent application to a substrate.

* * * * *